United States Patent [19]
Kim et al.

[11] Patent Number: 6,088,150
[45] Date of Patent: Jul. 11, 2000

[54] 3-CHANNEL LIGHT MODULATOR AND MODULATION METHOD FOR A HIGH POWER LASER

[75] Inventors: Yong Hoon Kim, Yangji-Town; Seung Nam Cha; Hang Woo Lee, both of Kyunggi-Do, all of Rep. of Korea

[73] Assignee: Samsung Electronics Co., Ltd., Suwon, Rep. of Korea

[21] Appl. No.: 09/060,362

[22] Filed: Apr. 15, 1998

[30] Foreign Application Priority Data

Aug. 22, 1997 [KR] Rep. of Korea ....................... 97-40043

[51] Int. Cl.[7] ..................................................... G02F 1/33
[52] U.S. Cl. ........................... 359/310; 359/308; 359/311; 359/285
[58] Field of Search ..................................... 359/285, 286, 359/287, 305, 310, 254

[56] References Cited

U.S. PATENT DOCUMENTS

| | | | |
|---|---|---|---|
| 3,869,197 | 3/1975 | Owens et al. | 359/311 |
| 4,112,461 | 9/1978 | Owens | 359/305 |
| 4,541,712 | 10/1985 | Whitney | 359/310 |
| 4,611,245 | 9/1986 | Trias | 359/305 |
| 4,696,551 | 9/1987 | Amano et al. | 359/311 |

FOREIGN PATENT DOCUMENTS 56-14217  2/1981  Japan .

*Primary Examiner*—Georgia Epps
*Assistant Examiner*—Margaret Burke
*Attorney, Agent, or Firm*—Burns, Doane, Swecker & Mathis, L.L.P.

[57] ABSTRACT

A 3-channel modulation system for a high power laser and a modulation method for a high power laser are disclosed herein. In a preferred implementation, the modulation system includes a laser light source, a light modulator modulating the light generated from the laser light source and including a pair of electrodes having a predetermined area disposed on one side of the light modulator, an image signal generating sub-system, a drive circuit sub-system for operating the electrodes so that the image signal being generated from the image signal generating sub-system is provided through the electrodes to the light modulator, a first cylindrical lens positioned between the laser light source and the light modulator so that the area and form of the light generated from the laser light source are modified and the modified light enters the light modulator, and a second cylindrical lens positioned at an output side of the light modulator to modify the area and form of the light modulated by the light modulator. The method includes the steps of generating laser light from a laser light source, modulating the light generated from the laser light source, providing an electrode means image signal to electrodes of the light modulation means, the electrodes having a predetermined area, operating the electrodes, modifying the area and form of the light which is between the laser light source and the light modulation means and generated from the laser light source, and causing the modified light to enter the light modulation means, and modifying the area and form of the light which is output by the light modulator means.

7 Claims, 2 Drawing Sheets

3-CHANNEL LIGHT MODULATOR AND MODULATION METHOD FOR A HIGH POWER LASER

FIELD OF THE INVENTION

The present invention relates to a method for using a cylindrical lens in the front-end and back-end of a light modulator for increasing the brightness of the image by using a high power laser beam for a laser image projection system. More specifically, this invention relates to a laser image projection apparatus and a method using a laser as a light source, modulating the light from the light source to a light modulator according to the image signal and projecting the image information to a screen using a scanner.

DESCRIPTION OF THE RELATED ART

The prior realizable apparatuses for a large area display are by means of a projector type using a CRT or LCD, but they have some problems and technical restrictions. A laser projector directly projecting the laser light loading image information to a screen can also be used as an image apparatus for a large area display.

This type of laser projector has advantages: it can realize a large area display, it has high contrast and high light efficiency, no distortion and no color error, and it can realize brightness and contrast independently of distance and can be applied to the HDTV of a large area display.

However, in the prior art image apparatus of the laser projection type, the brightness of projection image is greatly dependent on the entering power of the laser. Therefore, it has a disadvantage in that while the laser power should be increased so as to achieve an image with high brightness, doing so can damage each optical sub-system and modulating sub-system in the laser projection system. Specifically, it has a disadvantage that in the case of using the light modulator using a $TeO_2$ crystal as the modulating sub-system, the A/R (Anti-Reflection) coating film coated on the surface of $TeO_2$ crystal may be light-damaged. The power of the laser entering coating film is in inverse proportion to the diameter of the beam.

SUMMARY

One object of the present invention is to provide, for a 3-channel light modulator used for modulating a high power laser beam of red, green and blue, a 3-channel light modulation apparatus which can increase the brightness of the projection display by using a cylindrical lens and modifying the design of the electrode of the light modulator so as not to damage the light modulator with laser light.

Another object of the present invention is to provide, for a 3-channel modulator used for modulating high power laser beams of red, green and blue, a 3-channel light modulation method which can increase the brightness of the projection display by using a cylindrical lens and modifying the design of the electrode of the light modulator so as not to light-damage the light modulator.

In carrying out the present invention according to one embodiment, a 3-channel light modulation system for a high power laser includes a laser light source, a light modulator modulating the light generated from the laser light source including a pair of electrodes disposed on one side of the light modulator having a predetermined area, an image signal generating sub-system, a drive circuit sub-system for operating the electrodes so that the image signal being generated from the image signal generating sub-system is provided through the electrodes to the light modulator, a first cylindrical lens positioned on an input side of the light modulator between the laser light source and the light modulator so that the area and form of the light generated from the laser light source are modified and the modified light enters the light modulator, and a second cylindrical lens positioned on an output side of the light modulator to modify the area and form of the light modulated by the light modulator.

In carrying out the present invention according to another embodiment, a 3-channel light modulation method for a high power laser of the present invention includes a steps of generating a light beam from a laser light source, modulating the light generated from the laser light source via a light modulator, providing an electrode means image signal to electrodes having a predetermined area disposed on one side of the light modulator, operating the electrodes, modifying the area and form of the light which is between the laser light source and the light modulator and generated from the laser light source, and causing the modified light to enter the light modulator, and modifying the area and form of the light which is output from the light modulator.

BRIEF DESCRIPTION OF THE DRAWINGS

Other objects and advantages of the invention will become apparent upon reading the following detailed descriptions and upon reference to the drawings.

Figure 1:
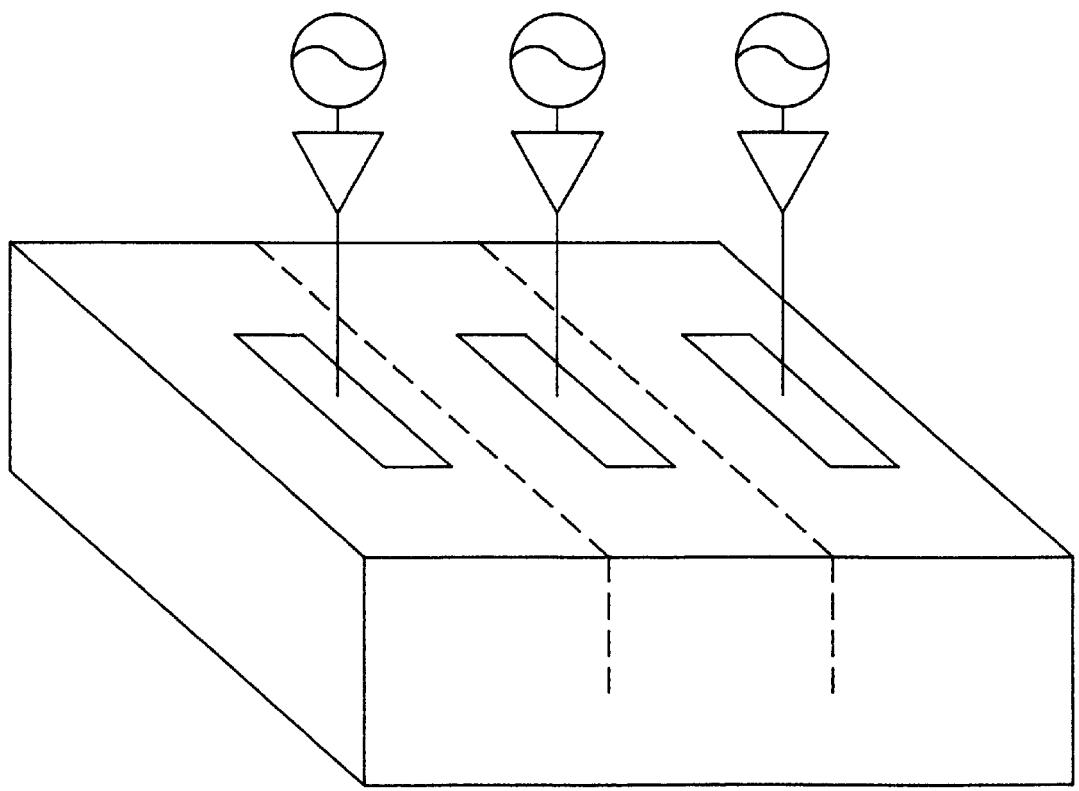
FIG. 1 illustrates a brief view of a 3-channel light modulator.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION

To achieve an object of the present invention, one embodiment of a 3-channel light modulation system for a high power laser according to the present invention includes:

(a) a laser light source;

(b) a light modulator modulating the light generated from the laser light source and including a pair of electrodes having a predetermined area disposed on one side of the light modulator;

(c) an image signal generating sub-system;

(d) a drive circuit sub-system for operating the electrodes so that the image signal being generated from the image signal generating sub-system is provided through the electrodes to the light modulator;

(e) a first cylindrical lens positioned between the laser light source and the light modulator so that the area and form of the light generated from the laser light source are modified and the modified light is made to enter the light modulator; and (f) a second cylindrical lens positioned at an output side of the light modulator to modify the area and form of the light modulated by the light modulator.

In the present invention, according to one embodiment that the light modulator is one chosen from among an AOM (acousto-optic modulator), an EOM (electro-optic modulator) and an AOTF (acousto-optic tunable filter). According to a preferred embodiment, the light modulator is an acousto-optic modulator.

In the present invention, according to one embodiment, the laser light sources are three laser light sources of red, green and blue, and the light modulation system includes a light modulator, an image signal generating sub-system, a drive circuit sub-system, a first cylindrical lens and a second cylindrical lens for each of the three laser light sources.

To achieve another object of the present invention, one embodiment of a 3-channel light modulation method for a high power laser according to the present invention includes the steps of:

(a) generating laser light from a laser light source;

(b) modulating the light generated from the laser light source via a light modulation means;

(c) providing an electrode means image signal to the light modulation means by using electrodes disposed on one side of the light modulation means, said electrodes having a predetermined area;

(d) operating the electrodes;

(e) modifying the area and form of the light input to the light modulation means from the laser light source, and causing the modified light to enter the light modulation means; and (f) modifying the area and form of the light output by the light modulation means.

According to one embodiment of the present invention, a first cylindrical lens is used for modifying the area and form of the light generated from the laser light source and causing the light to enter the light modulation means and a second cylindrical lens is used for modifying the area and form of the light modulated by the light modulation means.

According to one embodiment of the present invention, the cylindrical lenses have focal lengths of 400 mm and the cylindrical lens positioned in front of the light modulation means at its input side transforms the circular laser beam into an oval laser beam and the cylindrical lens positioned at the output side of the light modulation means transforms the oval laser beam into a circular laser beam.

According to one embodiment of the present invention, the magnitude of the electrode is adjusted by the following expression so as to maximize the diffraction efficiency of the light modulation means, where $\eta$ is light modulator efficiency, $P_a$ is acoustic power, H is electrode width, L is electrode length, $\lambda_0$ is laser wavelength, $M_2$ is acousto-optic figure of merit, and $\cos\theta$ is $(\cos\theta_i \cos\theta_d)^{1/2}$ in case of birefringent diffraction:

$$\eta = \sin^2\left\{\frac{\pi}{\lambda_0 \cos\theta}\left[\frac{M_2 L P_a}{2H}\right]^{\frac{1}{2}}\right\}.$$

The present invention will be explained in detail referring to the accompanying drawings.

The present invention can increase the laser damage threshold of the coating film by expanding the form of the laser beam entering the light modulator using a cylindrical lens in front of the incidence plane, and accordingly improve the brightness of the display by increasing the power of the laser. Additionally, it can improve the modulation efficiency of the light modulator by selecting the electrodes of the light modulator according to the form of the incidence laser beam.

The brightness of projection image depends greatly on the power of incidence of the laser beam, so a high power laser beam is indispensable to achieve an image with high brightness.

The laser image projection apparatus using a laser as the light source is comprised of a light generating sub-system 7, a light modulating sub-system 8, an image signal generating sub-system 6, a scanning sub-system (not shown), and a screen sub-system (not shown). Provided that the light generating sub-system 7 generates a particular light beam, the generated beam enters the light modulating sub-system 8, and the light modulating sub-system modulates 8 the entered beam according to the image signal provided from the image signal generating sub-system 6. Here, the pixel units of information are loaded in the modulated beam. By continuously scanning the beam modulated as stated above through the scanning sub-system to the screen sub-system in serial, the image is displayed on the screen. According to the present invention, for the light modulator of the light modulating sub-system used to scan the laser beam spot to the screen sub-system, acousto-optic modulator, electro-optic modulator, or acousto-optic tunable filter devices can be used.

Figure 2:
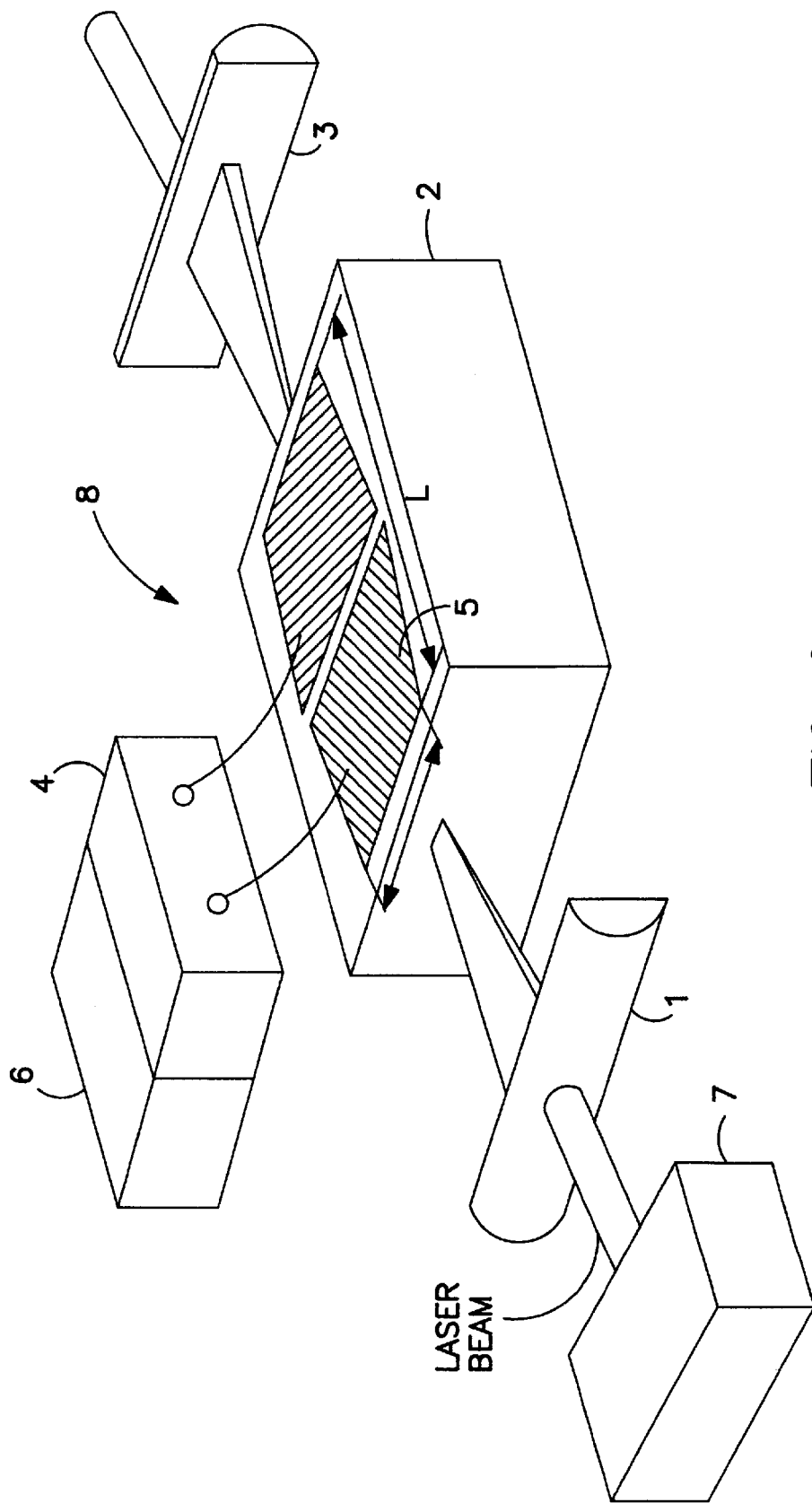
FIG. 2 illustrates a schematic perspective view of a structure of one embodiment of the light modulation system according to the present invention.

FIG. 1 illustrates a brief view of a 3-channel light modulator according to one embodiment of the present invention. The light modulator is comprised of 3-channels to modulate the red, green and blue laser beams. FIG. 2 illustrates an enlarged view of only a 1-channel light modulator system from a 3-channel light modulator.

According to a preferred embodiment, the light modulator 2 is an acousto-optic modulator. Accordingly, the following description is made using an acousto-optic modulator. It is within the skill of the ordinary artisan to modify the light modulation system according to the teachings of the present invention to use an electro-optic modulator or acousto-optic tunable filter.

In FIG. 2, cylindrical lens 1 is disposed on an input side of the light modulator between the laser light source and the light modulator. Cylindrical lens 1 plays a role in transforming the circular form of the incidence beam into an oval form by expanding it in one direction. According to one embodiment, the cylindrical lens 1 has a focal length of 400 mm. RF drive circuit 4 operates the electrodes 5 of the light modulator 2. According to one embodiment of the present invention, a drive frequency of 144 MHz is used and the input power at this time is about 2.6 W. Cylindrical lens 3 is disposed on an output side of the light modulator. Cylindrical lens 3 plays a role in transforming the oval form of the beam modulated through the light modulator into a circular form and then transmitting it to the scanning sub-system. According to one embodiment, the focal length of the cylindrical lens 3 is 400 mm. The focal length of the cylindrical lenses 1 and 3 can be changed according to the needs of the light modulation system according to the teachings of the present invention.

In FIG. 2, the entered laser beam passes through the cylindrical lens 1. Here, the cylindrical lens transforms the circular form of the incidence laser beam into the oval form and causing the modified light to enter the light modulator. The power intensity of the laser beam entering the surface of the AOM can be expressed as the following mathematical equation 1.

Equation 1:

$$I = \frac{P}{S} = \frac{P}{\frac{\pi D^2}{4}}$$

Here, I is the power intensity per unit area of the laser beam (W/mm$^2$), P is the power of the laser beam, S is the unit area of the incidence beam and D is the diameter of the laser beam. In the case of using a cylindrical lens 1, 3 with a focal length of 400 mm, the form or size of the beam is increased about three times along one axis. At this time, the area of an ellipse is three times as large as the circular form. Accordingly, the intensity of the incidence laser beam can be increased by three times relative to a system without the cylindrical lenses 1, 3 as it enters the modulator 2. Cylindrical lens 3 where the laser beam modulated in the light modulator passes through transforms the oval form of the modulated beam into the circular form and then transmitting it to the scanning sub-system.

Additionally, since the form of the incidence beam for the light modulator is transformed, it is necessary to transform the form of the electrodes from the prior form of electrodes. The following equation 2 expresses the correlation of diffraction efficiency of the light modulator with the electrodes.

Equation 2:

$$\eta = \sin^2\left\{\frac{\pi}{\lambda_0 \cos\theta}\left[\frac{M_2 L P_a}{2H}\right]^{\frac{1}{2}}\right\}$$

Here, $\eta$ is light modulator efficiency, $P_a$ is acoustic power, H is electrode width, L is electrode length, $\lambda_0$ is laser wavelength, $M_2$ is acousto-optic figure of merit, and $\cos\theta$ is as shown in the following equation 3 in the case of birefringent diffraction.

Equation 3:

$$\cos\theta = (\cos\theta_i \cos\theta_d)^{\frac{1}{2}}$$

Equation 2 shows that the efficiency of the light modulator is closely related to the form of the electrodes, i.e., L and H. At this time, there is a problem in that as the area of the electrode increases, it becomes more difficult to impedance match with a RF (Radio Frequency) drive circuit.

In the case of using the prior lens for the light modulator with a drive frequency of 144 mm, the results of manufacture of the electrodes are L=9 mm, H=0.55 mm. In the case of using the cylindrical lens of the present invention, the electrodes were made such that the area of the electrodes, i.e., L and H, was changed to fit into the form of the laser beam, so it was an optimum condition. According to the present invention, the electrodes of the light modulator were made and used such that L was 7.45 mm and H was 1.5 mm. After the magnitudes of the electrodes were changed, the efficiency and the rise/fall time of the light modulator were measured. The results are as shown in the following table 1 and table 2.

TABLE 1

The result of measurement of efficiency in the case of using a general lens:

| Focal length of lens f [mm] | Efficiency [%] |
|---|---|
| 150 | 51 |
| 200 | 60 |
| 250 | 63 |
| 400 | 65 |

TABLE 2

The result of measurement of efficiency and rise/fall time in the case of using a cylindrical lens:

| Focal length of lens f [mm] | Efficiency [%] | Rise/fall time [nsec] |
|---|---|---|
| 300 | 78 | 60.5/50.7 |
| 400 | 79 | 69.5/46.3 |

As stated above, if the 3-channel AOM of the present invention is used for the light modulating sub-system of the laser image projection system, the diameter of one direction of the laser beam can be increased about three times rather than the prior AOM. This has an advantage in that the damage threshold of the laser entering the acoustic optical material of the light modulator can be increased and the image can be scanned increasing the power of the laser about three times, so the picture brightness of the image projection apparatus can be improved.

We claim:

1. A 3-channel modulation system for a high power laser comprising:

a laser light source;

a light modulator comprising an acousto-optic device for modulating the light generated from said laser light source and including a pair of electrodes having a predetermined area disposed on one side of said light modulator;

an image signal generating sub-system for generating an image signal;

a drive circuit sub-system for operating said electrodes so that the image signal being generated from said image signal generating sub-system is provided through said electrodes to said light modulator;

a first cylindrical lens positioned at an input side of the light modulator between said laser light source and said light modulator so that area and form of the light generated from said laser light source are modified and the modified light enters said light modulator; and a second cylindrical lens positioned on an output side of said light modulator to modify the area and form of the light modulated by said light modulator, wherein the magnitude of said electrodes is adjusted by the following expression so as to maximize the diffraction efficiency of said light modulation means, where $\eta$ is light modulator efficiency, $P_a$ is acoustic power, H is electrode width, L is electrode length, $\lambda_0$ is laser wavelength, $M_2$ is acousto-optic figure of merit, and $\cos\theta$ is $(\cos\theta_i \cos\theta_d)^{1/2}$ in case of birefringent diffraction:

$$\eta = \sin^2\left\{\frac{\pi}{\lambda_0 \cos\theta}\left[\frac{M_2 L P_a}{2H}\right]^{\frac{1}{2}}\right\}.$$

2. A 3-channel modulation system for a high power laser as set forth in claim 1, wherein said light modulator is chosen from among an acousto-optic modulator, and an acousto-optic tunable filter.

3. A 3-channel modulation system for a high power laser as set forth in claim 1, wherein said laser light sources are three laser light sources of red, green and blue, respectively, and said modulation system comprises a light modulator, an image signal generating sub-system, a drive circuit sub-system, a first cylindrical lens and second cylindrical lens for each of said three laser light sources.

4. A 3-channel modulation system for a high power laser as set forth in claim 2, wherein said laser light sources are three laser light sources of red, green and blue, respectively, and said modulation system comprises a light modulator, an image signal generating sub-system, a drive circuit sub-system, a first cylindrical lens and second cylindrical lens for each of said three laser light sources.

5. A 3-channel light modulation method for a high power laser comprising the steps of:

generating the light from a laser light source;

modulating the light generated from said laser light source via light modulation means, comprising an acousto-optic device;

providing an image signal to electrodes of said light modulation means, said electrodes having a predetermined area;

modifying an area and shape of the light which is between said laser light source and said light modulation means and generated from said laser light source, and causing the modified light to enter said light modulation means; and modifying the area and of the light output by said light modulation means, wherein the magnitude of said electrodes is adjusted by the following expression so as to maximize the diffraction efficiency of said light modulation means, where η is light modulator efficiency, $P_a$ is acoustic power, H is electrode width, L is electrode length, $\lambda_0$ is laser wavelength, $M_2$ is acousto-optic figure of merit, and cos θ is $(\cos\theta_i \cos\theta_d)^{1/2}$ in case of birefringent diffraction:

$$\eta = \sin^2\left\{\frac{\pi}{\lambda_0 \cos\theta}\left[\frac{M_2 L P_a}{2H}\right]^{\frac{1}{2}}\right\}.$$

6. A 3-channel light modulation method for a high power laser as set forth in claim 5, wherein said step of modifying the area and shape of the light generated from said laser light source and causing the light to enter said light modulation means is performed by a first cylindrical lens disposed on an input side of said light modulation means and said step of modifying the area and form of the light modulated by said light modulation means is performed by a second cylindrical lens disposed on an output side of said light modulation means.

7. A 3-channel light modulation method for a high power laser as set forth in claim 6, wherein said first and second cylindrical lenses have a focal length of 400 mm and said first cylindrical transforms a substantially circular shaped laser beam into a substantially oval shaped laser beam and said second cylindrical lens transforms a substantially oval shaped laser beam into a substantially circular shaped laser beam.

* * * * *